United States Patent [19]
Losada

[11] Patent Number: 5,788,444
[45] Date of Patent: Aug. 4, 1998

[54] FASTENER ASSEMBLY FOR USE WITH A POWER ACTUATED GUN

[76] Inventor: Al Losada, 204 Folino Dr., Bridgeport, Conn. 06606

[21] Appl. No.: 801,167

[22] Filed: Feb. 18, 1997

Related U.S. Application Data

[60] Continuation-in-part of Ser. No. 610,278, Mar. 4, 1996, Pat. No. 5,634,756, which is a division of Ser. No. 393,866, Feb. 24, 1995, Pat. No. 5,525,018, which is a division of Ser. No. 48,493, Apr. 16, 1993, Pat. No. 5,417,534.

[51] Int. Cl.$^6$ ............................................. F16B 15/00
[52] U.S. Cl. ...................... 411/441; 411/490; 411/493
[58] Field of Search .............................. 411/440, 441, 411/487, 490, 493, 497

[56] References Cited

U.S. PATENT DOCUMENTS

| | | |
|---|---|---|
| 98,438 | 12/1869 | Smith . |
| 729,336 | 5/1903 | Hass ........................................ 411/493 |
| 2,768,552 | 10/1956 | McDonald ................................ 411/493 |
| 2,961,210 | 11/1960 | Pfaff et al. . |
| 2,968,984 | 6/1961 | DeCaro . |
| 3,212,388 | 10/1965 | Rosselet . |
| 3,452,637 | 7/1969 | O'Brien . |
| 3,921,495 | 11/1975 | Braun . |
| 4,287,656 | 9/1981 | Gassman ................................... 411/440 |
| 4,703,883 | 11/1987 | Losada . |
| 4,736,923 | 4/1988 | Losada . |
| 4,907,928 | 3/1990 | Beck ........................................ 411/441 |
| 4,915,561 | 4/1990 | Burhi . |
| 4,932,819 | 6/1990 | Almeras ................................... 411/441 |
| 5,110,247 | 5/1992 | Losada . |
| 5,178,503 | 1/1993 | Losada . |
| 5,261,770 | 11/1993 | Hoepker . |
| 5,292,216 | 3/1994 | Van Allman ............................. 411/441 |
| 5,417,534 | 5/1995 | Losada ..................................... 411/441 |
| 5,443,345 | 8/1995 | Gupta ...................................... 411/441 |
| 5,497,929 | 3/1996 | Armstrong ......................... 411/440 X |
| 5,525,018 | 6/1996 | Losada ..................................... 411/441 |

FOREIGN PATENT DOCUMENTS

| | | | |
|---|---|---|---|
| 1047890 | 12/1953 | France ...................................... 411/441 |
| 2504816 | 8/1975 | Germany . |

*Primary Examiner*—Flemming Saether
*Attorney, Agent, or Firm*—Fattibene and Fattibene; Paul A. Fattibene; Arthur T. Fattibene

[57] ABSTRACT

A fastener assembly having a stud frictionally retained within a plate. The stud having a head at one end and a point or taper at the other end. The stud having a first shank portion with a large diameter adjacent the head and a second shank portion with a smaller diameter adjacent the tapered or pointed end. The larger diameter first shank portion being frictionally or press fit into an aperture formed in the plate or washer. The plate or washer may have a flat, conical, curved, or channeled shape with a conical raised portion thereon so as to hold the fastener a relatively long longitudinal distance up along the shaft or shank of the stud. The transitional shoulder between the different diameters of the shank may be square, angled or round. The use of different diameter portions improves penetrating and holding power of the fastener assembly while permitting relatively easy penetration of a substrate.

16 Claims, 3 Drawing Sheets

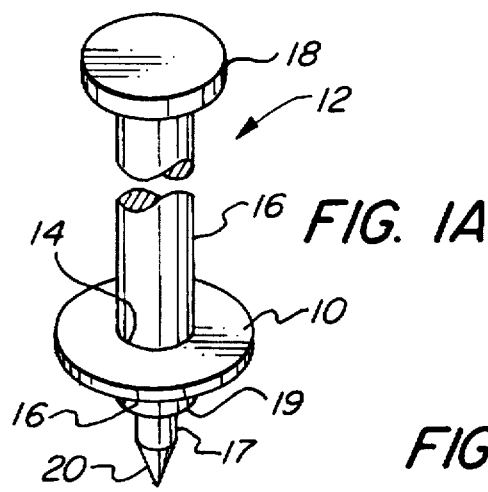
FIG. 1A
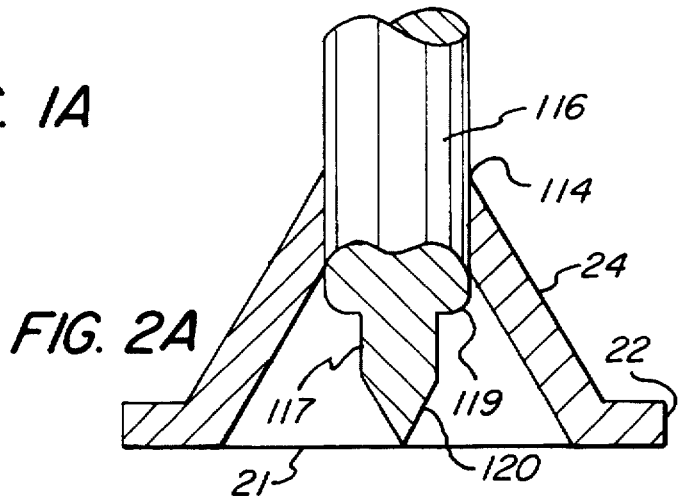
FIG. 2A
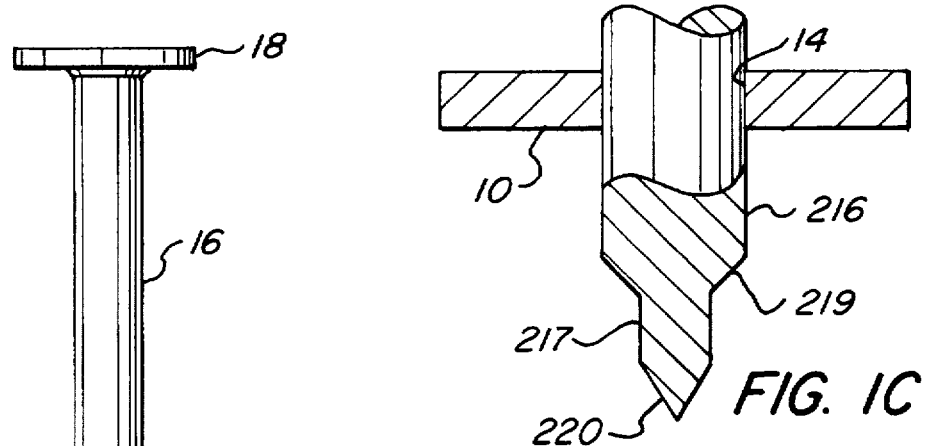
FIG. 2B    FIG. 1C
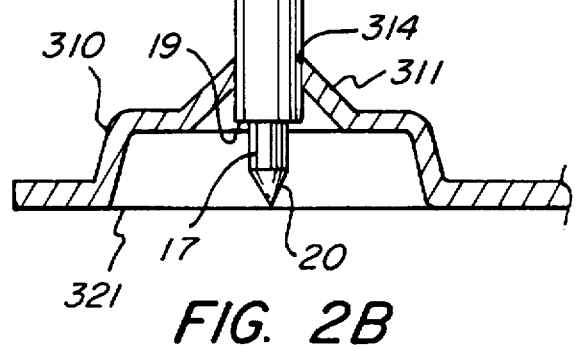
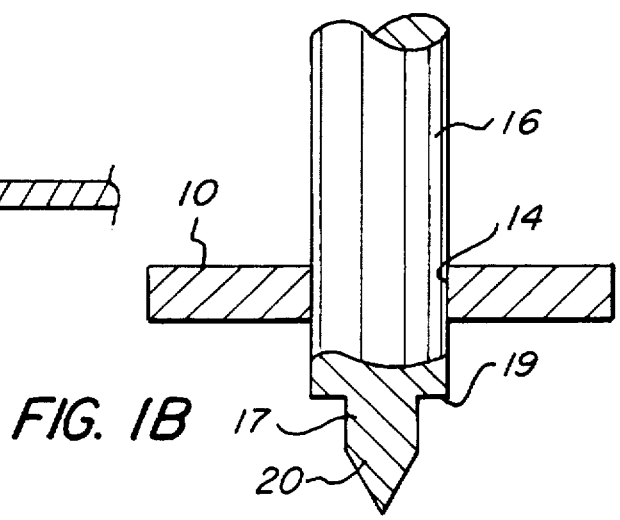
FIG. 1B 5,788,444

1

FASTENER ASSEMBLY FOR USE WITH A POWER ACTUATED GUN

RELATED APPLICATIONS

This application is a continuation-in-part of application Ser. No. 08/610,278 filed Mar. 4, 1996, now U.S. Pat. No. 5,634,756 which is a divisional of application Ser. No. 08/393,866 filed Feb. 24, 1995 now U.S. Pat. No. 5,525,018, which is a divisional of application Ser. No. 08/048,493 filed Apr. 16, 1993 now U.S. Pat. No. 5,417,534.

FIELD OF THE INVENTION

The present invention relates generally to fasteners for use in construction for attaching materials to masonry type surfaces with a power actuated gun, and more particularly to a nail or stud with an attached washer or plate.

BACKGROUND OF THE INVENTION

There are many different types of fasteners that are used with a power actuated gun. These fasteners are used in construction for attaching wood, plastic, or steel structural members to masonry type surfaces such as stone, brick, or masonry walls. One such fastener is disclosed in U.S. Pat. No. 5,417,534 issuing May 23, 1995 to Losada and entitled "Fastener Assembly For Use With Power Actuated Gun", which is herein incorporated by reference. Therein disclosed are fastener assemblies having a variety of different shapes. The nail or stud used therewith has a shank with a head and a pointed end that is driven into the surface of a substrate. The shaft disclosed therein is substantially a constant diameter and has a predetermined holding power which is, to some extent, a function of the shaft diameter. Another fastener disclosed in U.S. Pat. No. 5,292,216 issuing May 8, 1994 to VanAllen and entitled "Fastener Assembly For A Power Actuated Tool", which is herein incorporated by reference. Therein disclosed is a fastener assembly having a chimney portion through which is placed a drive pin. The drive pin has a double diameter near the head portion that is used to control outward curling of a distal end of the chimney portion upon driving the drive pin. The larger diameter near the head portion of the drive pin results in some of the energy or force applied to the drive pin being used to provide a controlled outward curling of the chimney portion. Additionally, this larger diameter is not utilized in improving the holding power of the fastener assembly.

While these and other fasteners used in a power actuated gun have proven useful in many applications, there is a need to improve the holding power of such fasteners while maintaining or reducing the force required to drive such fasteners.

SUMMARY OF THE INVENTION

The present invention comprises a fastener assembly having a plate or washer with an aperture therein. A stud having a head at one end and a tapered or pointed end at the other end with a shank there between. A portion of the shank has a first diameter and another portion of the shank has a second diameter. The first portion near the head of the shank has a diameter larger than the second portion near the tapered or pointed end of the shank. The aperture in the washer is sized to frictionally hold or retain the larger diameter first portion of the shank. The transition from the second diameter near the tapered or pointed end may be rounded, angled, or square. Additionally, the washer or plate may have a raised portion or a channel which permits the

2 tapered or pointed end of the stud to be raised above a bottom surface of the washer or plate.

Accordingly, it is an object of the present invention to provide an improved fastener having increased holding strength.

It is another object of the present invention to provide a fastener that may more easily penetrate a masonry like substrate or be driven more easily.

It is an advantage of the present invention that it is easily positioned.

It is another advantage of the present invention that the fastener has increased holding power.

It is a feature of the present invention that a double diameter shaft is used.

These and other objects, advantages, and features will become readily apparent in view of the following more detailed description.

BRIEF DESCRIPTION OF THE DRAWINGS

FIG. 1A is a perspective view of one embodiment of the present invention.

FIG. 1B is a partial cross section illustrating a square shoulder transition from a smaller diameter portion to a larger diameter portion of the shaft of the present invention.

FIG. 1C is a partial cross sectional view illustrating an angled transition from a smaller diameter portion to a larger diameter portion of the shaft of the present invention.

FIG. 2A is a partial cross section illustrating another embodiment of the present invention.

FIG. 2B is a partial cross section illustrating yet another embodiment of the present invention.

DETAILED DESCRIPTION OF THE PREFERRED EMBODIMENTS

Figure 3A:
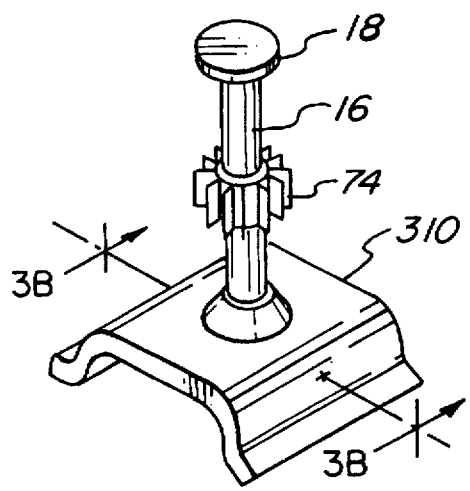
FIG. 3A is a perspective view illustrating another embodiment of the present invention.

FIG. 1A illustrates one type of fastener assembly of the present invention. A round washer 10 has placed therein a stud 12. The washer 10 may also be square. Stud 12 has a first shank portion 16 adjacent a head 18 and a second shank portion 17 adjacent a tapered or pointed end 20. Between the first shank portion 16 and the second shank portion 17 is a shoulder 19. The first shank portion 16 has a diameter larger than the second shank portion 17. Within the washer 10, an aperture 14 is formed. Aperture 14 is of a size such that the first shank portion 16 is frictionally retained or press fit therein. In this embodiment, a portion of the first shank portion 16, the second shank portion 17, and the tapered or pointed end 20 extend below the bottom surface of the round washer 10. In some applications, this configuration may be desirable. FIG. 1B illustrates more clearly a portion of the embodiment of the present invention illustrated in FIG. 1A. In this embodiment, the shoulder 19 is square or perpendicular to a longitudinal axis of the first and second shank portions 16 and 17. As can clearly be seen, the first shank portion 16 has a larger diameter than the second shank portion 17. The second shank portion 17 may be of a diameter of any dimension less than the diameter of the first shank portion 16. However, depending upon the application that diameter of the second shank portion 17 may be one-half that of the diameter of the first shank portion 16. Additionally, the longitudinal length of the second shank portion 17 need not be very long and is substantially less than that of the longitudinal length of the first shank portion 16. Accordingly, the first shank portion 16 may be made of a larger diameter than would normally be possible or desired for being driven into a relatively hard substrate. FIG. 1C is a partial cross section illustrating another embodiment of the present invention. In this embodiment, the washer 10 having an aperture 14 therein has a first shank portion 216 frictionally held or press fit therein. A second smaller or reduced diameter shank portion 217 is placed adjacent the tapered or pointed end 220. An angled shoulder 219 acts as a transition from the first larger diameter shank portion 216 and the second smaller diameter shank portion 217.

FIG. 2A illustrates another embodiment of the present invention. In this embodiment, a substantially square plate 22 has a raised portion 24 with substantially straight sides forming a cone shape having an aperture 114 at the apex thereof. Placed at the aperture 114 is a first diameter shank portion 116. The first diameter shank portion 116 is frictionally fit or press fit within the aperture 114. A second diameter shank portion 117 extends below the aperture 114. The first diameter shank portion has a larger diameter than the second diameter shank portion 117. In this embodiment, the shoulder 119 acting as a transition from the larger diameter first shank portion 116 to the smaller diameter second shank portion 117 is rounded. In this embodiment, the tapered or pointed end 120 does not extend below a bottom plane 21 of the square plate 22. Therefore, the square plate 22 forms a relatively stable surface such that the fastener can be accurately positioned before being driven by a power actuated gun.

FIG. 2B illustrates yet another embodiment of the present invention. In FIG. 2B, a plate or washer 310 is used having a shape such that a raised conical portion 311 is formed on a top surface of a channel formed within plate 310. The larger diameter first shank portion 16 is placed within an aperture 314 so as to be frictionally held or press fit therein. The legs of the channel formed within plate 310 provide a stable platform, as well as permit the conical sides of the raised portion 311 to hold the first shank portion 16 relatively high up along its longitudinal length. Accordingly, the distance between the aperture 314 and a bottom plane 321 formed by the bottom surface of plate or washer 310 is relatively long, aiding in the stable and substantially perpendicular placement of the fastener assembly prior to being driven by a power actuated gun.

Figure 3B:
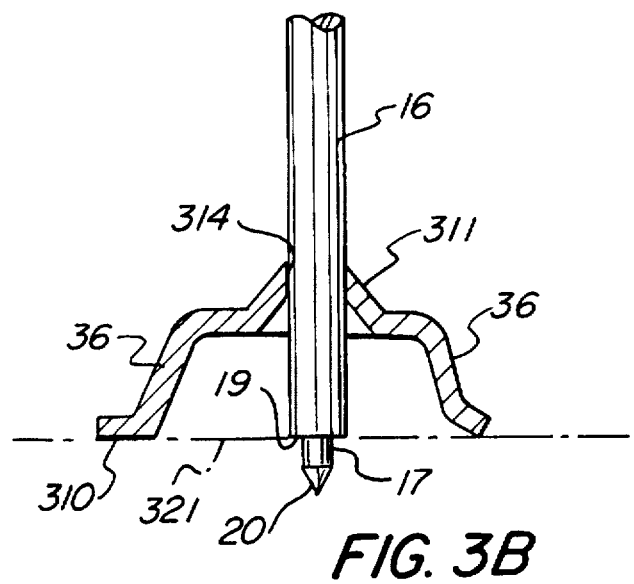
FIG. 3B is a partial cross section taken along line 3B—3B in FIG. 3A.

FIGS. 3A and 3B illustrate another embodiment of the present invention that is similar to that illustrated in FIG. 2B with the exception that the second reduced diameter shank portion 17 extends below a bottom plane 321. Additionally, as illustrated in FIG. 3A, a plastic flute 74 may be utilized to help retain and guide the fastener assembly within the bore of a power actuated gun, not shown. The smaller portion of the second reduced diameter shank portion 17 extending below the bottom plane 321 helps to hold the fastener assembly in position prior to being driven by a power actuated gun, not shown.

Figure 4A:
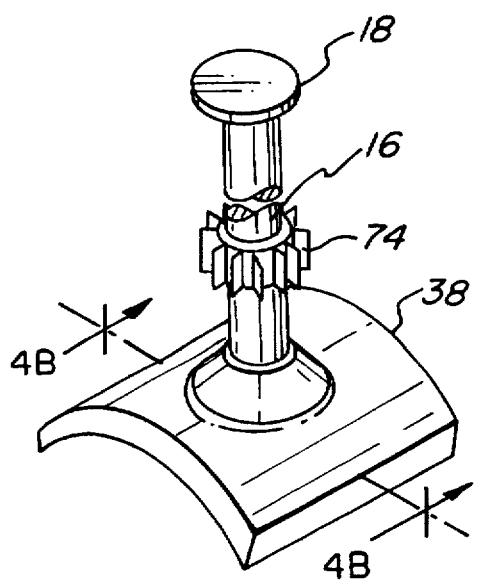
FIG. 4A is a perspective view of another embodiment of the present invention.
Figure 4B:
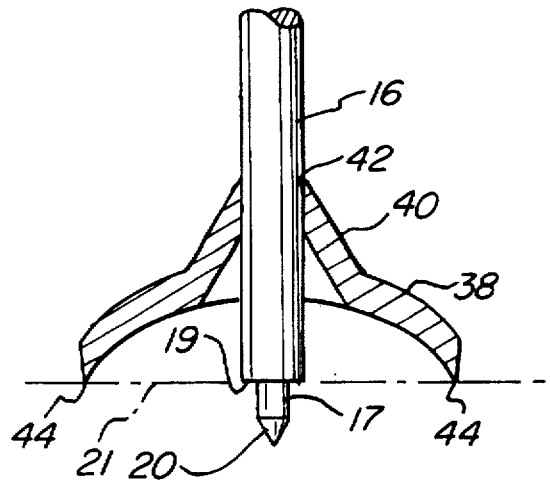
FIG. 4B is a partial cross section taken along line 4B—4B in FIG. 4A.

FIGS. 4A and 4B illustrate another embodiment of the present invention that has a substantially continuously curved plate 38 with a cone or raised portion 40 thereon. At the apex of cone 40 is an aperture 42 through which the larger diameter first shank portion 16 is placed. The feet 44 help to position and stabilize the fastener assembly. The reduced diameter second shank portion 17 may also extend below a bottom plane 21 formed by the feet 44. This configuration, with the reduced diameter second shank portion extending below a bottom plane 21, is particularly useful when a softer material, such as wood, is being fastened to a harder substrate, such as masonry or concrete. It has been discovered that the substantially curved plate 38, in combination with the feet 44, tend to be driven into the softer material such as wood. This effectively prevents the wood from rotating when one fastener assembly is used, or before a second fastener assembly is driven. The rectangular shape of the plate or washer 38 contributes greatly to the resistance of the material being fastened from rotating.

Figures 5A, 5B:
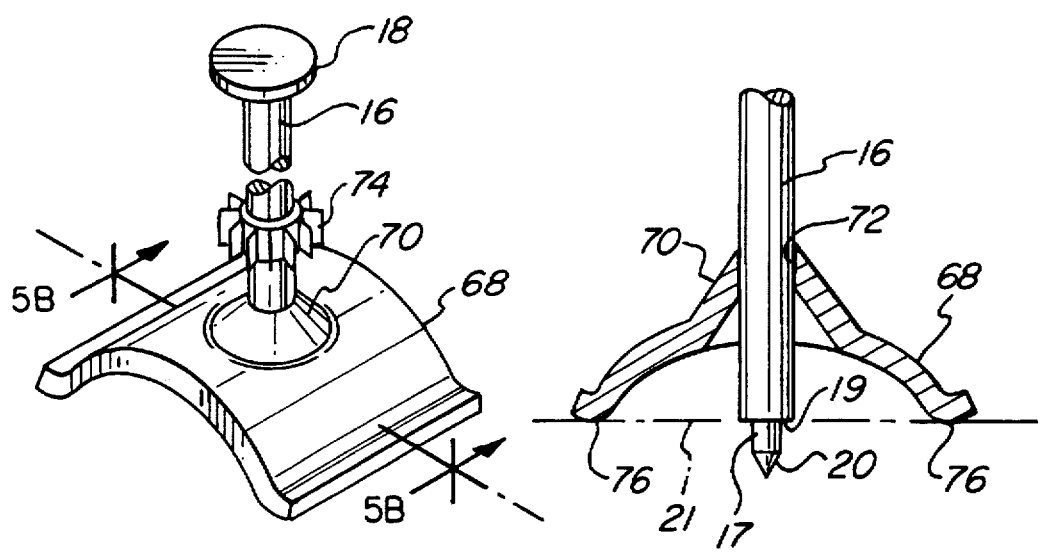
FIG. 5A is a perspective view of another embodiment of the present invention.
FIG. 5B is a partial cross section taken along line 5B—5B in FIG. 5A.

FIGS. 5A and B illustrate another embodiment of the present invention similar to that illustrated in FIGS. 4A and B, with the exception that the bearing feet 76 are not as pointed or as sharp as the feet 44 illustrated in FIG. 4B. A substantially curved plate 68 has a raised portion 70 thereon with an aperture 72 therein. Similar to the other embodiments described above, the first larger diameter shank portion 16 is frictionally held or press fit into the aperture 72. Similarly in this embodiment, the reduced diameter second shank portion 17 may extend below a bottom plane 21 formed by the bearing feet 76. With the second reduced diameter shank portion 17 extending below the bottom plane 21, the reduced diameter shank portion 17 easily penetrates a substrate with reduced force. This helps stabilize the fastener and prevent slipping of the fastener assembly prior to being driven by a power actuated gun. This greatly increases safety in use of the device. Additionally, the curved plate 68 in combination with the raised or cone portion 70 permits the sides of the cone 70 to provide support to the first shank portion 16 at a longitudinal distance relatively high up along its length. This greatly facilitates stability and perpendicular driving of the fastener assembly.

While many different embodiments have been illustrated and described, it should be appreciated that there are features of the present invention that may be modified and combined with other features of the present invention to form different devices suitable for a particular application without departing from the spirit and scope of this invention. For example, while the fastener assembly of the present invention has been illustrated with different washers or plates and different shoulder portions between the larger diameter first shank portion and the smaller diameter second shank portion, different combinations may be made. Additionally, while some embodiments illustrate a portion of the stud extending below a bottom plane, in some applications it might be desirable not to have a portion of the stud extend below a bottom plane. For example when the substrate on which the fastener assembly is placed is hard, such as a masonry type surface. However, when the substrate being fastened is a relatively soft material, for example wood, it may be desirable to have a portion of the stud extend below the bottom plane of the fastener assembly.

What is claimed is:

1. A fastener assembly of a type which is driven into a support structure by a power actuated gun comprising:

a plate having a raised portion with an aperture therein and a bottom plane forming a distance between the aperture and the bottom plane; and a stud having a head at a first end and a taper or point at a second end, said stud having a first shank portion with a first diameter adjacent the first end and a second shank portion with a second diameter adjacent the second end, the first diameter being larger than the second diameter, said first shank portion being retained within the aperture a substantial distance from the second diameter, and the first shank portion being substantially longitudinally longer than the second shank portion with the second shank portion having a longitudinal length less than the distance between the aperture and the bottom plane, whereby the bottom plane of said plate provides stability.

2. A fastener assembly as in claim 1 wherein:

said plate is square.

3. A fastener assembly as in claim 1 wherein:

said plate has a raised conical portion.

4. A fastener assembly as in claim 1 wherein:

at least a portion of the second shank portion extends below the bottom plane.

5. A fastener assembly as in claim 1 wherein:

said plate forms a channel having a pair of legs.

6. A fastener assembly as in claim 1 wherein:

said plate is substantially continuously curved forming a portion of a cylinder.

7. A fastener assembly as in claim 1 wherein:

a transition between the first diameter and the second diameter of said stud is square.

8. A fastener assembly as in claim 1 wherein:

a transition between the first diameter and the second diameter of said stud is angled.

9. A fastener assembly as in claim 1 wherein:

a transition between the first diameter and the second diameter of said stud is rounded.

10. A fastener assembly as in claim 1 wherein:

the second shank portion does not extend below the bottom plane.

11. A fastener assembly of a type which is driven into a support structure by a power actuated gun comprising:

a plate having an aperture, said plate being substantially continuously curved forming a portion of a cylinder and having a bottom plane; and a stud having a head at a first end and a taper or point at a second end, said stud having a first shank portion with a first diameter adjacent the first end and a second shank portion with a second diameter adjacent the second end, the first diameter being larger than the second diameter, said first shank portion being retained within the aperture a substantial distance from the second diameter and the second shank portion has a length less than the distance between the aperture and the bottom plane.

12. A fastener assembly as in claim 11 further comprising:

a raised conical portion formed within said plate around the aperture.

13. A fastener assembly as in claim 11 wherein:

at least a portion of the second shank portion extends below the bottom plane.

14. A fastener assembly as in claim 11 wherein:

the first shank portion has a first longitudinal length and the second shank portion has a second longitudinal length, the first longitudinal length being substantially greater than the second longitudinal length.

15. A fastener assembly as in claim 11 further comprising:

a flute placed around the first shank portion.

16. A fastener assembly of a type which is driven into a support structure by a power actuated gun comprising:

a plate having a raised portion with an aperture therein and a bottom plane forming a distance between the aperture and the bottom plane;

a stud having a head at a first end and a taper or point at a second end, said stud having a first shank portion with a first diameter adjacent the first end and a second shank portion with a second diameter adjacent the second end, the first diameter being larger than the second diameter, said first shank portion being retained by a press fit within the aperture;

a transition between the first diameter and the second diameter, the second diameter being approximately one half the first diameter;

the first shank portion having a first longitudinal length and the second shank portion having a second longitudinal length, the first longitudinal length being substantially greater than the second longitudinal length and the second longitudinal length being less than the distance between the aperture and the bottom plane;

a flute placed on the first shank portion; and the second end extending below the bottom plane, whereby the bottom plane of said plate provides stability and the second end penetrates a relatively soft substrate preventing unintentional movement of the fastener assembly.

\* \* \* \* \*